US012154331B2

(12) United States Patent
Fields et al.

(10) Patent No.: US 12,154,331 B2
(45) Date of Patent: Nov. 26, 2024

(54) SYSTEMS AND METHODS FOR FINDING GROUP MEMBERS VIA AUGMENTED REALITY

(71) Applicant: STATE FARM MUTUAL AUTOMOBILE INSURANCE COMPANY, Bloomington, IL (US)

(72) Inventors: Brian M. Fields, Phoenix, AZ (US); Nathan L. Tofte, Downs, IL (US); Aaron C. Williams, Bloomington, IL (US); Joseph P. Harr, Bloomington, IL (US); Vicki King, Bloomington, IL (US)

(73) Assignee: STATE FARM MUTUAL AUTOMOBILE INSURANCE COMPANY, Bloomington, IL (US)

(*) Notice: Subject to any disclaimer, the term of this patent is extended or adjusted under 35 U.S.C. 154(b) by 71 days.

(21) Appl. No.: 17/962,113

(22) Filed: Oct. 7, 2022

(65) Prior Publication Data
US 2024/0054779 A1    Feb. 15, 2024

Related U.S. Application Data

(60) Provisional application No. 63/397,456, filed on Aug. 12, 2022.

(51) Int. Cl.
*G06V 20/20*    (2022.01)
*G01C 21/34*    (2006.01)
(Continued)

(52) U.S. Cl.
CPC ......... *G06V 20/20* (2022.01); *G01C 21/3415* (2013.01); *G01C 21/3476* (2013.01);
(Continued)

(58) Field of Classification Search
None
See application file for complete search history.

(56) References Cited

U.S. PATENT DOCUMENTS 9,269,011 B1 * 2/2016 Sikka ................ G06V 20/20
2011/0316880 A1   12/2011 Ojala et al.
(Continued)

FOREIGN PATENT DOCUMENTS

WO    WO-2022162670 A1 *  8/2022    ......... A61B 17/1615

OTHER PUBLICATIONS

Author: Google Australia; Title: An easier way to find your friends with Live View; source: https://www.youtube.com/watch?v=R8BGiLZmxmE; Date: Sep. 8, 2020 (Year: 2020).*
(Continued)

*Primary Examiner* — Jwalant Amin
(74) *Attorney, Agent, or Firm* — MARSHALL, GERSTEIN & BORUN LLP

(57) ABSTRACT

The following generally relates to using Augmented Reality (AR) to enhance pedestrian navigation. In some examples, AR techniques are applied to provide AR indications of a location of a group member that includes two or more AR devices. In these examples, AR techniques may be applied to determine a relative position of the group member and/or provide navigational guidance to the group member. In other examples, AR techniques are applied to provide AR-assisted pedestrian guidance. In these examples, AR techniques may be applied to present an AR display that includes information for a point of interest along a route.

19 Claims, 13 Drawing Sheets

(51) Int. Cl.
*G01C 21/36* (2006.01)
*G06T 7/73* (2017.01)
*G06T 11/00* (2006.01)
*H04B 10/116* (2013.01)
*H04N 7/22* (2006.01)

(52) U.S. Cl.
CPC ..... *G01C 21/3602* (2013.01); *G01C 21/3626* (2013.01); *G01C 21/3647* (2013.01); *G01C 21/365* (2013.01); *G01C 21/3682* (2013.01); *G06T 7/74* (2017.01); *G06T 11/00* (2013.01); *H04B 10/116* (2013.01); *H04N 7/22* (2013.01)

(56) References Cited

U.S. PATENT DOCUMENTS

| | | | | |
|---|---|---|---|---|
| 2015/0153571 A1* | 6/2015 | Ballard | ............... | H04N 23/61 345/8 |
| 2016/0109940 A1* | 4/2016 | Lyren | ............... | G06F 3/011 463/2 |
| 2018/0190023 A1* | 7/2018 | Anderson | ............... | G06T 7/246 |
| 2018/0194344 A1 | 7/2018 | Wang et al. | | |
| 2019/0035165 A1 | 1/2019 | Gausebeck | | |
| 2019/0215654 A1* | 7/2019 | Engelen | ............... | H04W 4/023 |
| 2019/0362192 A1* | 11/2019 | Steiner | ............... | G06F 18/24 |
| 2020/0110178 A1* | 4/2020 | Dagley | ............... | H04W 64/00 |
| 2021/0092555 A1 | 3/2021 | Mayor et al. | | |
| 2022/0189075 A1 | 6/2022 | Lynch et al. | | |
| 2022/0397412 A1 | 12/2022 | Woo et al. | | |
| 2023/0043578 A1* | 2/2023 | Lee | ............... | G01C 21/3623 |
| 2023/0135286 A1* | 5/2023 | Pasha | ............... | A61B 34/32 703/20 |

OTHER PUBLICATIONS

Author: Tommy Palladino; Title: Use Augmented Reality to Find Your Friends in Google Maps; source: https://android.gadgethacks.com/how-to/use-augmented-reality-find-your-friends-google-maps-0337649/; Date: Sep. 11, 2020 (Year: 2020).*

Brata, Location-Based Augmented Reality Inforamtion for Bus Route Planning System, International Journal of Electrical and Computing Engineering, Feb. 2015 (Year: 2015).

* cited by examiner

Group Settings

Group A: (202)

| Member (204) | Device ID (206) | Can See Your Location? (208) | Actions (210) | |
|---|---|---|---|---|
| You | ...XYZ | N/A (209) | (212) | (214) |
| Alice | ...123 | Yes ▽ | Find | Navigate |
| Bob | ...ABC | Yes ▽ | Find | Navigate |
|  | ...456 | No ▽ | Find | Navigate |
| Add (216) | | | | |

3rd Party Permissions

| Service (222) | Permissions (224) |
|---|---|
| Ride Share Co. | Allow ▽ (226) |

FIG. 2

SYSTEMS AND METHODS FOR FINDING GROUP MEMBERS VIA AUGMENTED REALITY

CROSS-REFERENCE TO RELATED APPLICATIONS

This application claims priority to and the benefit of the filing date of provisional U.S. Patent Application No. 63/397,456 entitled "Systems and Methods for Pedestrian Augmented Reality," filed on Aug. 12, 2022, the entire contents of which are hereby expressly incorporated herein by reference.

FIELD

The present disclosure generally relates to Augmented Reality (AR), and more particularly relates to using AR to provide additional information to pedestrians.

BACKGROUND

AR techniques enable the integration of virtual displays and the real world. To this end, an AR display may be configured to overlay information about a current environment of a person wearing an AR viewer.

Often, people visit locations (e.g., a mall, a concert, an airport, etc.) in groups. Accordingly, when the group separates, it may be difficult to locate where the other group members are at any given time. Additionally, in crowded environments, such as concerts or marketplaces, even if one knows the general location of their group member, it may be difficult to spot their exact location in the crowd. Thus, there is a need to apply AR techniques to facilitate the process of reuniting group members.

Further, navigation applications are often particularly adapted for vehicle navigation. However, this means the navigation applications may be less suited for traversing pedestrian pathways. For example, pedestrian pathways may be open spaces (e.g., at a convention center, park, etc.). Thus, the markers for where to turn when following a route may not align with pathway and/or street intersections. As another example, vehicles typically include vehicle lighting. Thus, lighting conditions may have a larger impact on pedestrian navigation. Conventional techniques may have additional drawbacks as well.

SUMMARY

In one aspect, a computer-implemented method for finding group members via Augmented Reality (AR) may be provided. The method may be implemented via one or more local or remote processors, servers, transceivers, sensors, virtual reality or AR headsets or glasses, mobile devices, wearables, and/or other electronic or electric components. In one instance, the method may include (1) establishing, via one or more processors of an AR device, a group of AR devices that includes at least a second AR device; (2) obtaining, via the one or more processors, position data indicative of a location of the second AR device; (3) determining, via the one or more processors, a field of view of an AR viewer paired with the AR device; and/or (4) based upon the location of the second AR device and the field of view, presenting, via the one or more processors, an indication of the second AR device via the AR viewer. The method may include additional, fewer, or alternate actions, including those discussed elsewhere herein.

In another aspect, a system for finding group members via an Augmented Reality (AR) device may be provided. The system may include (i) one or more processors; and (ii) one or more non-transitory memories storing processor-executable instructions. The instructions, when executed by the one or more processors, may cause the system to (1) establish a group of AR devices that includes at least a second AR device; (2) obtain position data indicative of a location of the second AR device; (3) determine a field of view of an AR viewer paired with the AR device; and/or (4) based upon the location of the second AR device and the field of view, presenting an indication of the second AR device via the AR viewer. The system may perform additional, less, or alternate functionality, including that discussed elsewhere herein.

In yet another aspect, a non-transitory computer-readable storage medium storing computer-executable instructions may be provided. The instructions, when executed by one or more processors of an Augmented Reality (AR) device, may cause the one or more processors to (1) establish a group of AR devices that includes at least a second AR device; (2) obtain position data indicative of a location of the second AR device; (3) determine a field of view of an AR viewer paired with the AR device; and/or (4) based upon the location of the second AR device and the field of view, presenting an indication of the second AR device via the AR viewer. The instructions may cause the processors to perform additional, less, or alternate functionality, including that discussed elsewhere herein.

BRIEF DESCRIPTION OF THE DRAWINGS

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

The figures described below depict various aspects of the applications, methods, and systems disclosed herein. It should be understood that each figure depicts an embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

FIG. 2 illustrates an exemplary user interface associated with configuring a group of AR devices.

DETAILED DESCRIPTION

The systems and methods disclosed herein generally relate to, inter alia, using Augmented Reality (AR) to provide additional information to pedestrians. It should be appreciated that while the instant disclosure generally relates to pedestrians, the techniques may also be adapted to other persons that are navigating a pedestrian environment. For example, the techniques may be applied to people operating a wheelchair, a bicycle, a scooter, a skateboard, a Segway, a golf cart, etc. As such, unless expressly stated otherwise, the term "pedestrian" encompasses individuals that are utilizing an alternative mode of transportation in a pedestrian environment.

As used herein, the term AR should be understood to refer to the generation of a display that overlays digitally-generated information on a view of one's natural surroundings. This may include presenting a heads up display (HUD), alerts, and/or other indications of the digitally-generated information on a transparent surface of an AR viewer. In the pedestrian context, the transparent surface is typically included in a wearable AR viewer device. For example, the AR viewer may be an AR headset, AR glasses, AR contact lenses, and/or other wearable AR devices.

According to a first aspect, when a pedestrian is visiting a location as part of a group, the group often splits up or otherwise separates. For example, a group member may separate to use a restroom, purchase an item from a vendor, and/or visit a different portion of the location. Accordingly, techniques disclosed herein relate to applying AR techniques to locate separated group members and/or provide navigational instructions to reunite with the separated group members.

According to a second aspect, when navigating a pedestrian environment, there is often a need to navigate open spaces or other types of environments not associated with pre-defined pathways. As such, traditional navigation applications may be unsuited for pedestrian routes that often utilize points of interest (POIs) within the open environment as a reference point for navigation. Often the sound of the siren reflects off of nearby buildings making it difficult to determine where the emergency vehicle is currently located and how to safely yield. Accordingly, techniques disclosed herein relate to applying AR techniques to improve pedestrian navigation.

Example Pedestrian Augmented Reality (Ar) System

Figure 1:
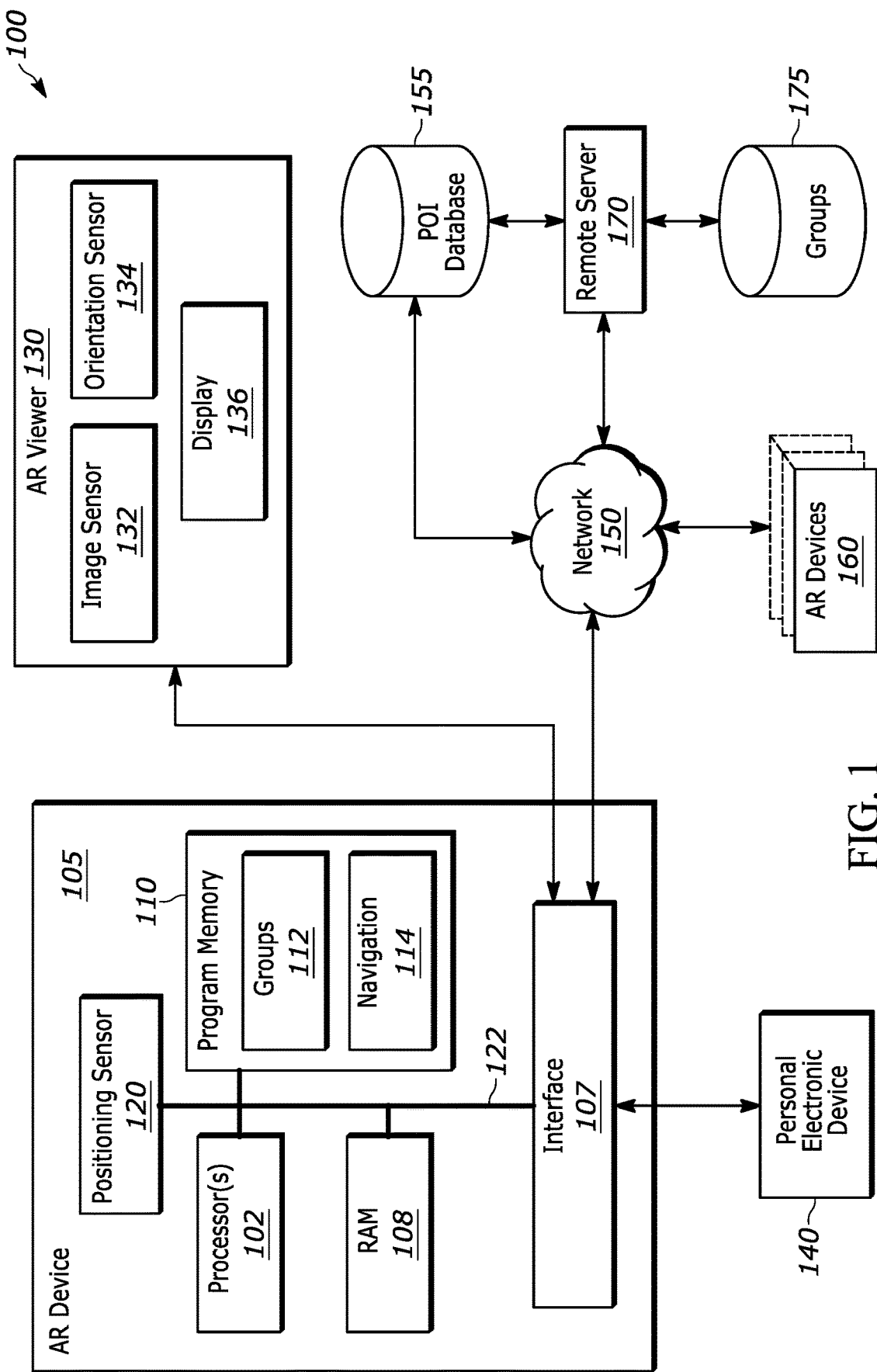
FIG. 1 shows an exemplary system for implementing the disclosed Augmented Reality (AR) techniques disclosed herein.

FIG. 1 illustrates a block diagram of an exemplary pedestrian AR system 100 in which the techniques disclosed herein may be implemented. The pedestrian AR system 100 includes an AR device 105 that is paired with an AR viewer 130. The AR device 105 may be an electronic device configured to generate data that is viewable via the AR viewer 130. For example, the AR device 105 may be a personal electronic device, a dedicated AR base unit, a server, or an electronic device integrally formed with the AR viewer 130.

The AR device 105 may include one or more processors 102, such as a central processing unit (CPU) or a graphics processing unit (GPU). During operation, the processors 102 executes instructions stored in a program memory module 110 coupled to the processors 102 via a system bus 122. The system bus 122 may be any of several types of bus structures including a memory bus or memory controller, a peripheral bus, or a local bus, and may use any suitable bus architecture.

In some embodiments, the program memory module 110 is implemented in random access memory (RAM) 108, persistent memory, or both. The RAM 108 and/or the persistent memory include one or more forms of fixed and/or removable memory, such as read-only memory (ROM), electronic programmable read-only memory (EPROM), erasable electronic programmable read-only memory (EEPROM), and/or other hard drives, flash memory, MicroSD cards, and others.

The program memory module 110 may store computer-readable instructions that regulate the operation of the AR device 105. For example, the program memory 110 may include a groups application 112 configured to enable a user of the AR device 105 to find group members associated with AR devices 160, a navigation application 114 configured to support navigation of routes through pedestrian environments, and/or other applications, such as an application configured to interface with the AR viewer 130 to present AR displays thereat. It should be appreciated that while FIG. 1 depicts the groups application 112 and the mapping application 114 as separate applications, in some embodiments, a single application may support the functionality of both applications described herein.

Accordingly, the AR viewer 130 may include a display 136 via which the AR displays are presented. For example, the display 136 may be a surface positioned in a line of sight of the wearer of the AR viewer 130. Accordingly, the AR viewer may be configured to overlay AR information included in the AR display onto features of the natural environment within the line of sight of the wearer of the AR viewer 130. To determine the line of sight of the wearer, the AR viewer 130 may include an image sensor 132 (such as a camera) configured to have a field of view that generally aligns with the line of the sight of the wearer and an orientation sensor 134 (such as a gyroscope and/or an accelerometer) configured to determine an orientation of the AR viewer. The AR viewer 130 may be configured to transmit the image data and/or the orientation data to the AR device 105 such that the AR device 105 is able to generate an AR display that includes information related to objects within the line of sight of the wearer in a manner that is accurately overlaid on the natural environment.

The AR device 105 may also include a positioning sensor 120 configured to generate positioning data indicative of a current location of the AR device 105. The positioning sensor may be a Global Positioning System (GPS) sensor, including an assisted GPS (AGPS) sensor, or another type of positioning sensor.

As illustrated the AR device 105 may also include a communication interface 107 via which the AR device 105 communicates with other devices. As one example, the AR device 105 may be communicatively coupled to the AR viewer 130 via the interface 107. In some embodiments, the AR device 105 is communicatively coupled to the AR viewer 130 via a short-range communication link, such as a Bluetooth link, a Wi-Fi link, Zigbee link, a WiGig link, a Universal Serial Bus (USB) link, a serial link, and so on. Accordingly, the interface 107 may include one or more transceivers and/or modems configured to support the communication link type via which the AR viewer 130 is coupled. In embodiments where the AR device 105 and the AR viewer 130 are integrally formed, the communication link therebetween may be supported by a communication bus. In these embodiments, the interface 107 may include a bus controller configured to interface with the communication bus.

As another example, the AR device 105 may be communicatively coupled to a personal electronic device 140 associated with a wearer of the AR viewer 130. In these embodiments, the AR device 105 and the personal electronic device 140 may be communicatively coupled via a short range communication link. It should be appreciated that the short-range communication link between the AR device 105 and the personal electronic device 140 may utilize the same or different communication protocols as the short-range communication link between the AR device 105 and the AR viewer 130.

While FIG. 1 depicts the AR device 105 as being separate from the personal electronic device 104, in some embodiments, the AR device 105 is a personal electronic device. For example, the personal electronic device may be configured to execute an AR application (not depicted) in which a rear-facing camera captures image data of the physical environment proximate to the AR device 105 and overlays AR data onto a display screen thereof. Accordingly, in these embodiments, the functionality of the AR device 105, the personal electronic device 140, and/or the AR viewer 130 may be integrated at the personal electronic device. While the instant disclosure generally describes embodiments having separate AR devices 105, AR viewers 130, and/or personal electronic device 140, any such disclosure envisions embodiments where the AR device 105, the AR viewer 130, and/or the personal electronic device 140 are implemented at the same device.

As illustrated, the AR device 105 may also be communicatively coupled to one or more remote devices via a long-range communication network 150. For example, the long-range communication network 150 may be a satellite communication network, a cellular communication network (including LTE, New Radio, and/or 6G communication networks), a Wi-Fi communication network, and so on. Accordingly, the interface 107 may include one or more transceivers and/or modems configured to support communication links over the long-range communication network 150.

For example, the AR device 105 may be coupled to a remote server 170 via the communication network 150. The remote server 170 may be configured to support a grouping application, such as the groups application 112. For example, the remote server 170 may be configured to maintain a database 175 of groups and the data associated therewith. In some embodiments, the remote server 170 supports one or more user interfaces presented by the groups application 112 at the AR device 105. Additionally, the remote server 170 may be configured to automatically create and/or terminate one or more temporary groups to support one or more third party applications, such as a ride-sharing application.

In some embodiments, the AR device 105 is coupled to one or more AR devices 160 via the communication network 150. For example, the AR devices 160 may be AR devices included in a group of AR devices supported by the groups application 112. It should be appreciated that the AR devices 160 may or may not be paired with a respective AR viewer. To this end, an AR device 160 may be a personal electronic device or dedicated positioning device configured to execute a version of the grouping application 112 that enables the AR device 160 to transmit position information to the AR device 105. For example, the AR device 160 may be a windshield-mounted electronic device configured to signal a position of a ride-share, livery, and/or taxi vehicle a wearer of the AR viewer 130 should enter.

Additionally, the AR device 105 may be coupled to a point of interest (POI) database 155 configured to stored information relating to a plurality of POIs. For example, a self-guided tour service may store information about a plurality of POIs along a tour route in the database 155. Accordingly, as the navigation application 114 provides guidance related to the tour route, the navigation application 114 may query the database 155 to obtain information to generate an AR display to present via the AR viewer 130. As another example, the POI database may include photographs of the POI at different times of day. Accordingly, if the navigation application 114 is providing guidance at night, the navigation application 114 may query the database 155 to obtain image data of a POI along the route captured during daytime.

Exemplary Groups Management

Turning to FIG. 2, illustrated is an exemplary user interface 200 for configuring permissions associated with a groups application, such as the groups application 112 of FIG. 1, executing on an AR device, such as the AR device 105 of FIG. 1. The user interface elements described with respect to the user interface 200 are merely exemplary and alternate user interfaces may include additional, fewer, and/or alternative user interface elements.

The user interface 200 may include an indication 202 of a group to which the AR device belongs. For each group, the user interface 200 may enable the user to view information associated with other group members and configure permissions associated therewith. For example, the user interface 200 may include a column 204 indicating a name associated with members of the group and a column 206 that indicates device identifiers for devices that member has added to the group. The user interface 200 may also include an element 216 that enables users to add additional members and/or devices to the group. The information associated with the groups may be maintained at a groups database, such as the database 175 of FIG. 1.

As illustrated, the user interface 200 also includes a column 208 that enables the user to configure permissions associated with group members and/or devices. More particularly, the column 208 enables the user to configure permissions related to allowing the group member and/or device to locate the AR device via a drop down menu 209. Accordingly, if the group member has does not have permission to view the location of the AR device, a groups application executing on the corresponding device may prevent the groups application from locating the AR device. It should be appreciated that alternate user interfaces may include the ability to change other permissions, such as the ability to obtain and/or analyze image data indicative of a line of sight of the group member. According to certain aspects, changes to the permissions may be synchronized to the groups database.

The user interface 200 also includes a column 210 that enables the user to perform an action associated with a group member and/or a device corresponding thereto. For example, the column 210 may include an interface element 212 to initiate a process to find the group member and/or a device corresponding thereto (assuming the AR device has sufficient permissions). In some embodiments, in response to detecting an interaction with the element 212, a groups server, such as the remote server 170 of FIG. 1, may request that the corresponding device of the group member provides position data generated by a position sensor thereof. The server may then relay the position data to the AR device such that the AR device may compare the received position data to position data generated by a positioning sensor thereof, such as the positioning sensor 120 of FIG. 1, and generate an AR display that indicates a location of the group member device.

In some scenarios, such as when the group member device is in a crowded location, the position data may be insufficient to identify the exact location of the group member. Accordingly, in response to detecting an interaction with the element 212, the server may instead initiate a supplemental finding process by issuing a notification to the group member device. The notification may indicate that the user of the AR device is trying to find the group member device and the group member should perform an action to facilitate the finding process. For example, the notification may request that the group member holds the group member device in the air while the groups application executing on the group member device configures a light, such as a flash light, of the group member device to pulse in accordance with a visual light communication (VLC) protocol. The groups application executing on the AR device may then determine the group member location by identifying a source of the VLC communication.

As another example, in response to detecting an interaction with the element 212, the server may request that the group member device sends image data indicative of a line of sight of the group member (assuming the AR device has sufficient permissions). The server may also request that the AR device sends image data indicative of a line of sight of the user. The server may then identify a POI that is common between the received image data to determine a relative position between the AR device and the group member device and transmit an indication of the relative position to the AR device.

As illustrated, the column 210 may also include an interface element 214 to initiate a process to navigate to a group member and/or a device corresponding thereto. If the AR device successfully completed a finding process for the group member (e.g., in response to an interaction with the element 212), the navigation process may use the found position of the group member as the destination. More particularly, the server may cause a navigation application executing on the AR device (such as the navigation application 114 of FIG. 1) to provide navigational guidance to the found position of the group member. If the AR device has not successfully completed a finding process for the group member, the navigation process may first initiate a finding process in a similar manner as described with respect to the element 212.

It should be appreciated that in alternate embodiments, the column 210 may include additional actions. For example, an action to view image data generated at the group member device, an action to send a current location to the group member device, an action to identify a meet up location to which all group members should navigate, an action to navigate to the meet up location, etc.

The user interface 200 may also enable the user to manage permissions associated with third-party services that utilize the group functionality. Accordingly, the user interface 200 may include a column 222 that indicates third party services associated with the groups platform and a column 224 via which the user can manage permissions associated therewith via a selection interface 226. For example, in response to the user of the AR device ordering a ride via a ride-sharing service, the ride-sharing service may utilize the grouping platform to form temporary groups between the user and a device associated with the paired driver. Accordingly, the user of the AR device may utilize the disclosed finding and/or navigation techniques to identify which vehicle is the vehicle assigned by the ride-sharing service. Upon the completion of the ride, the ride-sharing service may then disband the group.

It should be appreciated that other third-party services may utilize the groups platform to enhance the services provided to the user. For example, an AR game service may utilize the groups platform to establish groups that include players that grouped up within the AR game. As another example, a guided tour service may establish a tour group to provide a common experience to members of the group.

AR Displays for Finding Group Members

Figure 3:
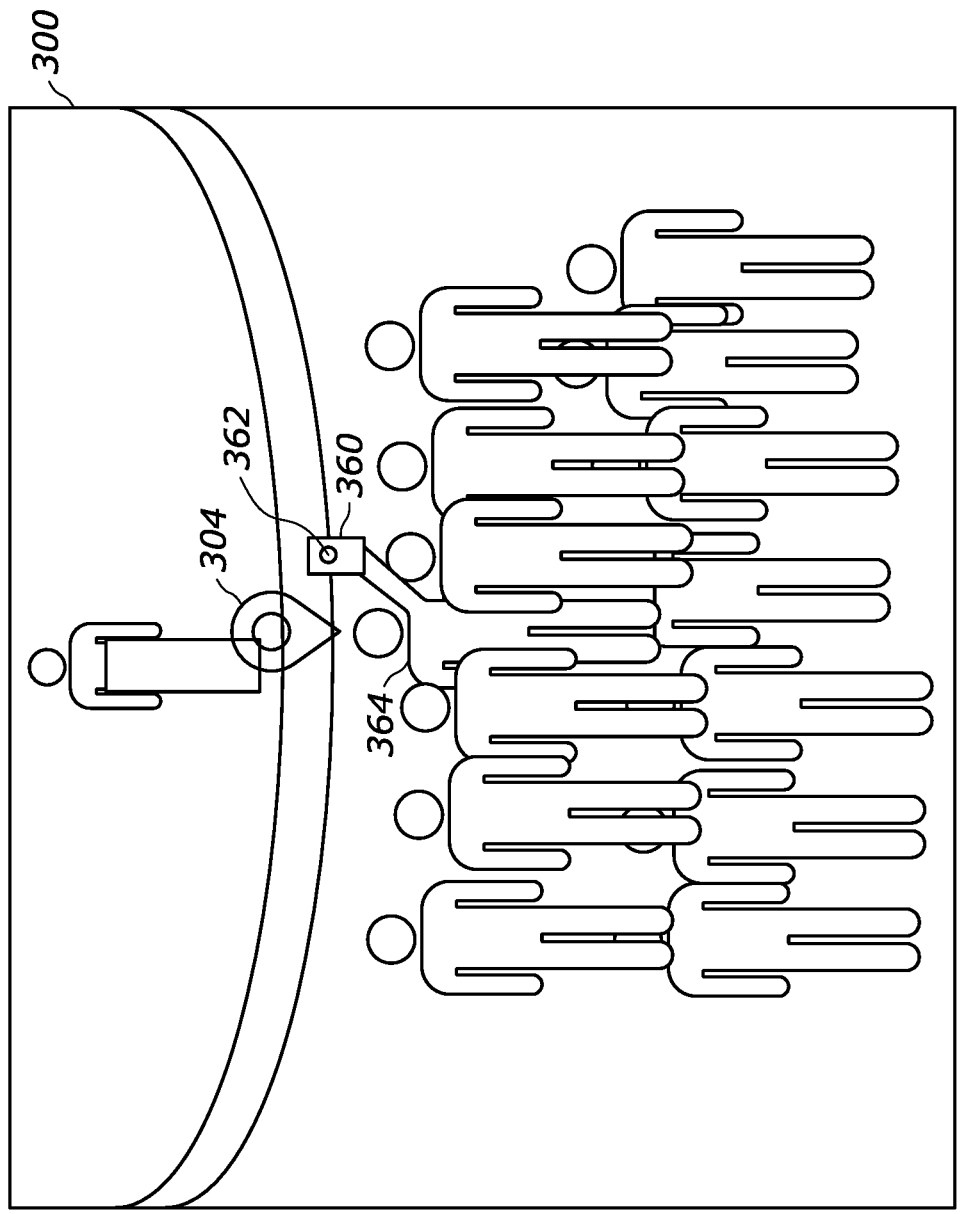
FIG. 3 illustrates an exemplary AR display for using VLC to locate a vehicle group member.
Figure 4:
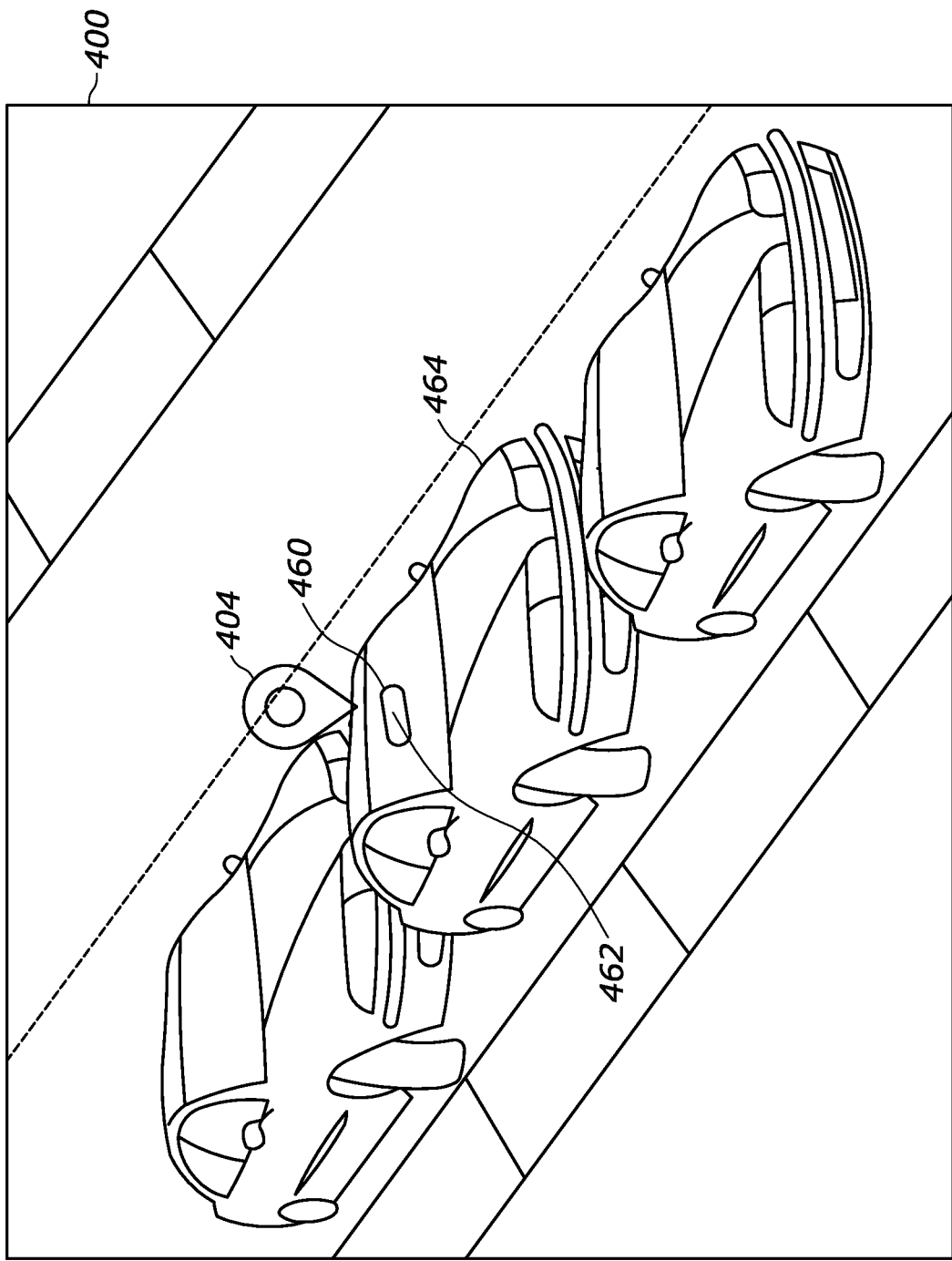
FIG. 4 illustrates an exemplary AR display for using VLC to locate a person group member in a crowd.

Turning now to FIGS. 3 and 4, illustrated are exemplary AR displays configured to present indications of a group member. The AR displays may be generated by an AR device (such as the AR device 105 of FIG. 1) subsequent to an interaction with a groups application (such as the groups application 112 of FIG. 1). The AR device may then transmit data associated with the AR display to an AR viewer (such as the AR viewer 130 of FIG. 1) for presentation thereat. It should be appreciated that the exemplary AR displays illustrated herein are merely exemplary, and alternative AR displays may include additional, fewer, and/or alternative indications of the group members.

Starting with FIG. 3, illustrated is an exemplary AR display 300 presented by an AR viewer (such as the AR viewer 130 of FIG. 1) coupled to an AR device (such as the AR device 105 of FIG. 1). In the illustrated scenario, the user is attempting to find a group member 364 carrying an AR device 360 (such an AR device 160 of FIG. 1). More particularly, the user is attempting to identify which person in the crowd of people is the group member 364.

The user may have first interacted with a user interface presented on the AR device (such as the user interface 200) to initiate a finding process for the AR device 360. Accordingly, a server (such as the remote server 170 of FIG. 1) may have transmitted a notification to the AR device 360 to inform the group member 364 that the user is attempting to locate them. The notification may indicate that the group member 364 should raise the AR device 360 into the air to facilitate the finding process. In response to detecting such a motion occurred (e.g., via an accelerometer and/or an analysis of image data) and/or after a predetermined amount of time has passed, the AR device 360 may then control a light 362 of the AR device 360 such that the light 362 encodes an identifier using a VLC protocol. In some embodiments, the identifier is a group member and/or AR device identifier (such as an identifier assigned to the group member and/or AR device when registering with the groups application). In other embodiments, the identifier is a one-time identifier transmitted by the groups server to both the AR device associated with the AR display 300 and the group member AR device 360 in response to initiating the finding process. The AR device 360 may configure the light 362 to repeatedly encode the identifier using the VLC protocol for a predetermined amount of time and/or until the finding process is complete.

While the AR device 360 is controlling the light 362, an image sensor (such as the image sensor 132 of FIG. 1) and/or a photodetector of the AR viewer may detect the light emitted by the light 362. In response, the AR device may decode the VLC signal to obtain an identifier. The AR device may then compare the obtained identifier to an expected identifier to verify that the decoded light was emitted by the AR device 360 (and not some other device utilizing VLC).

In response to verifying the identifier, the AR device may analyze image data generated by the image sensor of the AR viewer to identify the source of VLC signal (i.e., the light 362). Based upon the identified source, the AR device may then analyze the image data to identify a person associated with the source (i.e., the group member 364). After identifying which individual in the image data is the group member 364, the AR device may then generate an AR indicator 304 that indicates the location of the group member 364. More particularly, the AR device may configure the AR display 300 such that the AR indicator 304 is overlaid on the group member 364. In some embodiments, the AR indicator 304 may be associated with a dialog box that includes other information associated with the group member 364 (e.g., a name, an area of the venue, and so on) and/or additional actions (e.g., initiate navigation to the group member 364). Additionally, the AR device may indicate to the server that the finding process was successful.

Turning now to FIG. 4, illustrated is an exemplary AR display 400 presented by an AR viewer (such as the AR viewer 130 of FIG. 1) coupled to an AR device (such as the AR device 105 of FIG. 1). In the illustrated scenario, the user is attempting to find a ride-share vehicle 464 carrying an AR device 460 (such an AR device 160 of FIG. 1) that was assigned to the user via a ride-share service. In this scenario, the ride-share service may have created a temporary group that includes the AR device presenting AR display 400 and the AR device 460 upon assigning the ride-share vehicle 464 to the ride ordered by the user. It should be appreciated that while FIG. 4 illustrates the AR device 460 being in the form-factor of a windshield-mounted electronic device, in alternate embodiments, the AR device 460 is a personal electronic device coupled to a windshield-mounted light via a short-range communication link.

In response to receiving a notification that the ride-share vehicle 464 has arrived at the pickup location, the AR device may present a notification to initiate a finding process via a groups application (such as the groups application 112 of FIG. 1) or an application associated with the ride-sharing service that interfaces with the groups platform via an application programming interface (API). Regardless, the user may have first interacted with the notification to initiate a finding process for the AR device 460. Accordingly, a server (such as the remote server 170 of FIG. 1) may have transmitted a notification to the AR device 460 to control a light 462 of the AR device 460 such that the light 462 encodes an identifier using a VLC protocol. In some embodiments, the identifier is an identifier of the vehicle (such as a license plate). In other embodiments, the identifier is a one-time identifier transmitted by the groups server to both the AR device associated with the AR display 400 and the AR device 460 in response to initiating the finding process and/or assigned to the trip by the ride-sharing service. The AR device 460 may configure the light 462 to repeatedly encode the identifier using the VLC protocol for a predetermined amount of time and/or until the finding process is complete.

While the AR device 460 is controlling the light 462, an image sensor (such as the image sensor 132 of FIG. 1) and/or a photodetector of the AR viewer may detect the light emitted by the light 462. In response, the AR device may decode the VLC signal to obtain an identifier. The AR device may then compare the obtained identifier to an expected identifier to verify that the decoded light was emitted by the AR device 460 (and not some other device utilizing VLC).

In response to verifying the identifier, the AR device may analyze image data generated by the image sensor of the AR viewer to identify the source of VLC signal (i.e., the light 462). Based upon the identified source, the AR device may then analyze the image data to identify a vehicle associated with the source (i.e., the ride-share vehicle 464). After identifying which vehicle in the image data is the ride-share vehicle 464, the AR device may then generate an AR indicator 404 that indicates the location of the ride-share vehicle 464. More particularly, the AR device may configure the AR display 400 such that the AR indicator 404 is overlaid on the ride-share vehicle 464.

In some embodiments, the AR indicator 404 may be associated with a dialog box that includes other information associated with the ride-share vehicle 464 (e.g., a name of the driver, an image of the driver, a logo associated with the ride-share service, and so on) and/or additional actions (e.g., initiate navigation to the ride-share vehicle 464). Additionally, the AR device may indicate to the server that the finding process was successful.

Figure 5A:
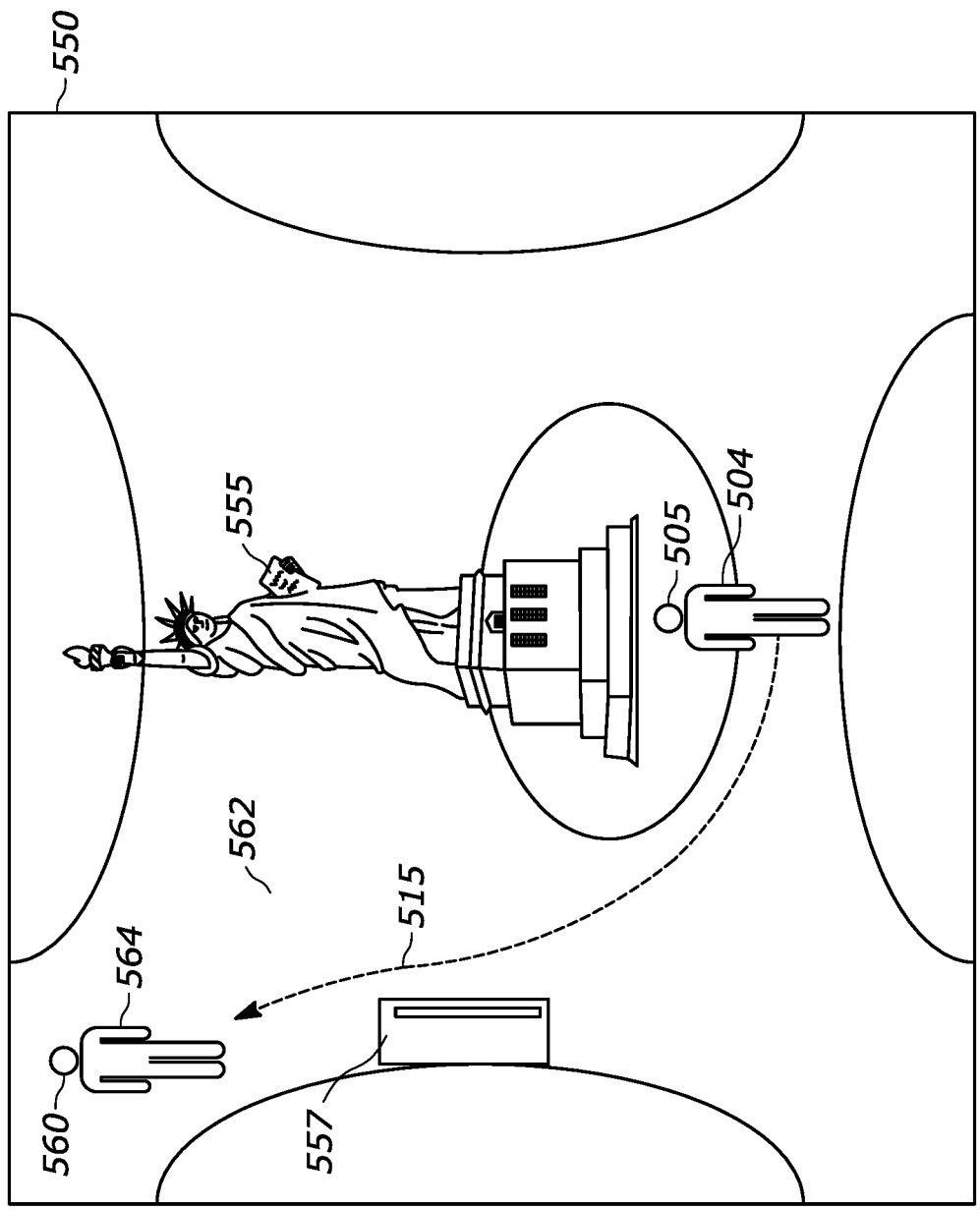
FIGS. 5A and 5B illustrate an exemplary environment and AR display, respectively, for using a common point of interest (POI) to find and navigate to a group member.
Figure 5B:
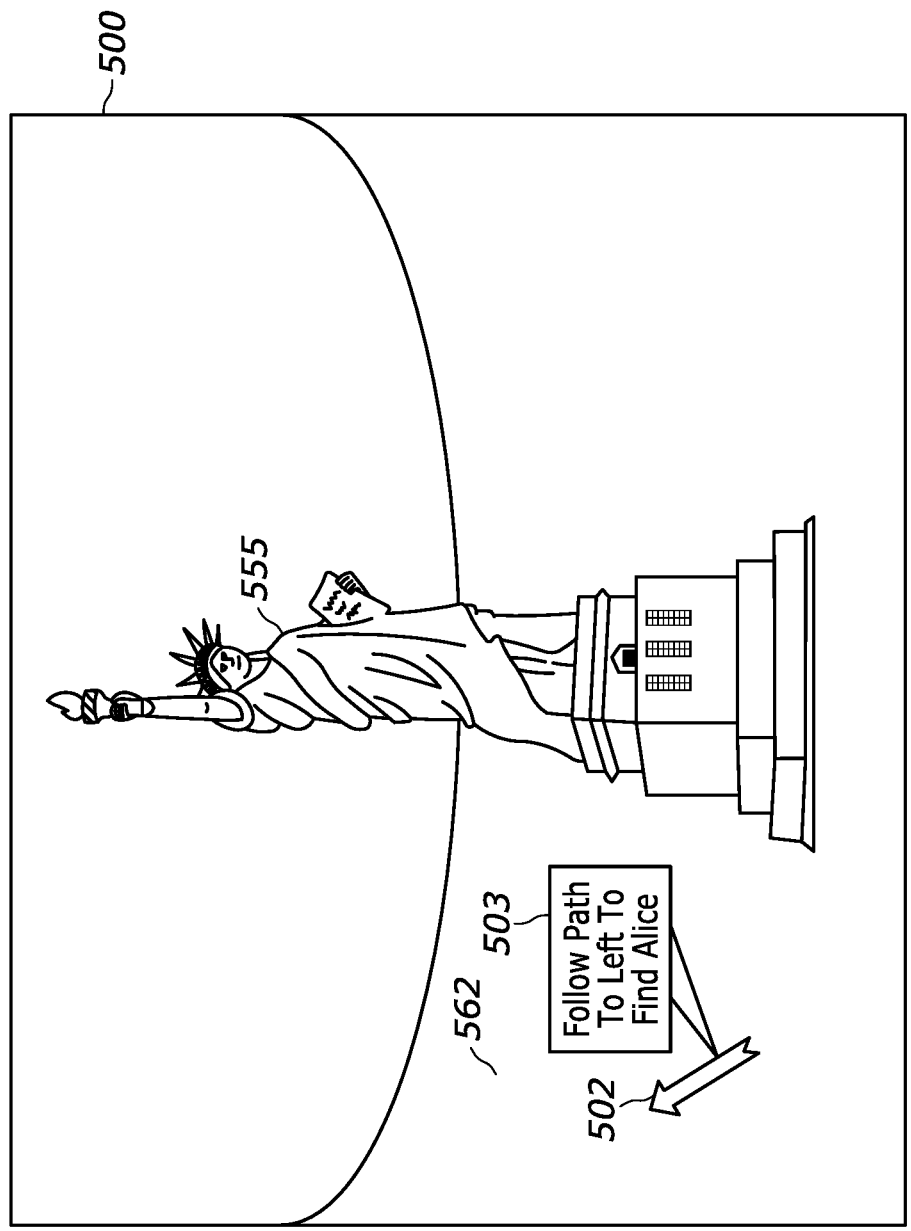

Turning now to FIGS. 5A and 5B, illustrated is an exemplary process for locating a group member based upon a point of interest (POI) and generating an ad-hoc navigation route to the located group member. More particularly, FIG. 5A illustrates an environment 550 that includes a user 504 wearing an AR viewer (such as the AR viewer 130 of FIG. 1) coupled to an AR device 505 (such as the AR device 105 of FIG. 1), a group member 564 wearing an AR viewer (such as a second AR viewer 130 of FIG. 1) coupled to an AR device 560 (such as an AR device 160 of FIG. 1), and a point of interest 555.

In the illustrated scenario, the user 504 may initiate a finding and/or a navigation process via a groups application (such as the groups application 112 of FIG. 1). In response, a groups server (such as the server 170 of FIG. 1) may attempt to determine a relative position of the user 504 and the group member 564 using the POI 555 as a common point of reference. Accordingly, the server may obtain a set of image data from an image sensor associated with the AR viewer coupled to the AR device 505 (such as the image sensors 132 of FIG. 1) and an image sensor associated with the AR device 560. While the term "set of image data" may refer to a single image (e.g., a JPEG file), the AR device 505, 560 may also capture multiple images of the environment 550 at different orientations to improve the ability of the server to determine a relative position. As such, in these embodiments, the "set of image data" may refer to multiple images and/or a video.

After obtaining the image data from the AR device 505 and the AR device 560, the server may analyze image data to identify candidate objects that potentially appear in both sets of image data. For example, the server may perform one or more object recognition algorithms that identify object types (e.g., persons, structures, animals, vehicles, benches, etc.) in image data. The server may then compare objects of the same type across both sets of image data to identify any objects that potentially correspond to the same object, such as by analyzing a color, shape, size, and/or other characteristics of the object. In some embodiments, the server may also utilize the position and orientation data to estimate a position of the objects within the environment 550.

Accordingly, in these embodiments, the estimated position of the object may be another factor analyzed by the server when identifying matching objects between the sets of image data. In the scenario illustrated in FIG. 5A, the server may identify the POI 555 within both sets of image data. While the POI 555 is a landmark, in other embodiments, other types of objects, including people, may be the common point of reference identified by the server.

The server may then analyze the representation of the POI 555 between the received sets of image data to identify a relative position of the AR device 505 and the AR device 560. For example, the server may identify a relative size of the POI 555 between the sets of image data to estimate a relative distance the AR device 505 and the AR device 560 is from the POI 555. As another example, the server may identify an orientation of the POI 555 as represented in both sets of image data. For some POIs, the server may be coupled to a POI database (such as the POI database 155) that includes previously captured image data of the POI from multiple perspectives.

Accordingly, the server may compare the received sets of image data to image data of the POI maintained at the POI database to identify an orientation of the AR device 505, 560 with respect to the POI 555. The server may then be able to determine the relative position between the AR devices 505, 560 based upon their respective relative distances and/or orientations with respect to the POI 555. The server may then transmit an indication of the relative position to the AR device 505, 560 for presentation via an AR display thereat.

As described herein, the AR display that includes an indication of the relative position may also include an interface element that enables the user 504 to initiate navigation to the found group member 564. Accordingly, in the illustrated scenario, the user 504 interacted with this element to initiate a navigation process. More particularly, the interaction with the element may cause the AR device 505 to launch a navigation application (such as the navigation application 114 of FIG. 1) in a state that utilizes the determined position of the group member 564 as the destination.

In the illustrated scenario, the AR device 505 may be configured to analyze the environment 550 to determine a route 515 to the group member 564 in an ad-hoc manner. For example, the environment 550 may be a pedestrian environment in which vehicle-based navigation applications are less suitable. For example, the environment 550 may include temporary stands, food carts, stages, construction areas, vegetation, and/or other objects not reflected in traditional mapping data. Accordingly, the navigation application may instruct the user 504 to capture a sweep of the area proximate to the AR device 505 to capture image data indicative thereof. The navigation application may then analyze the image data to identify traversable paths. More particularly, the navigation application may then stitch together image data captured during the sweep of the environment to generate a virtual environment that reflects the environment 550.

In the illustrated scenario, the navigation application may identify the path 562 and/or the borders defining the path 562 and identify the corresponding portions of the virtual environment as being traversable. In some embodiments, the navigation application utilizes mapping data for the environment 550 to assist in identifying the boundaries for the path 562 within the virtual environment. As another example, the navigation application may identify a food stall 557 located on the path 562. Accordingly, the navigation application may designate the corresponding portion of the path 562 in the virtual environment as being non-traversable. In some embodiments, the navigation application routes the image data to a remote server to assist in the generation of the virtual environment.

After generating the virtual environment based upon the image data representative of the environment 550, the navigation application may then generate the route 515 to guide the user 504 to the group member 564 via the portions of the virtual environment designated as traversable. It should be appreciated that while the route 515 is a relatively short route, for longer routes, the navigation may continuously analyze image data captured as the user traverse the route to expand the virtual environment and modify the route as needed to avoid any additional objects impeding the route.

FIG. 5B illustrates is an exemplary AR display 500 presented by an AR viewer (such as the AR viewer 130 of FIG. 1) coupled to the AR device 505 of FIG. 5A. In the illustrated scenario, the navigation application executing on the AR device 505 identified the route 515 that will guide the user 504 to the group member 564. Accordingly, the navigation application may configure the AR display 500 to include an AR indicator 502 that indicates a direction of travel the user 504 should follow to proceed along the route 515. The AR indicator 502 may correspond to a dialog box 503 that includes a verbal description of the indicated navigational instruction.

Figure 6A:
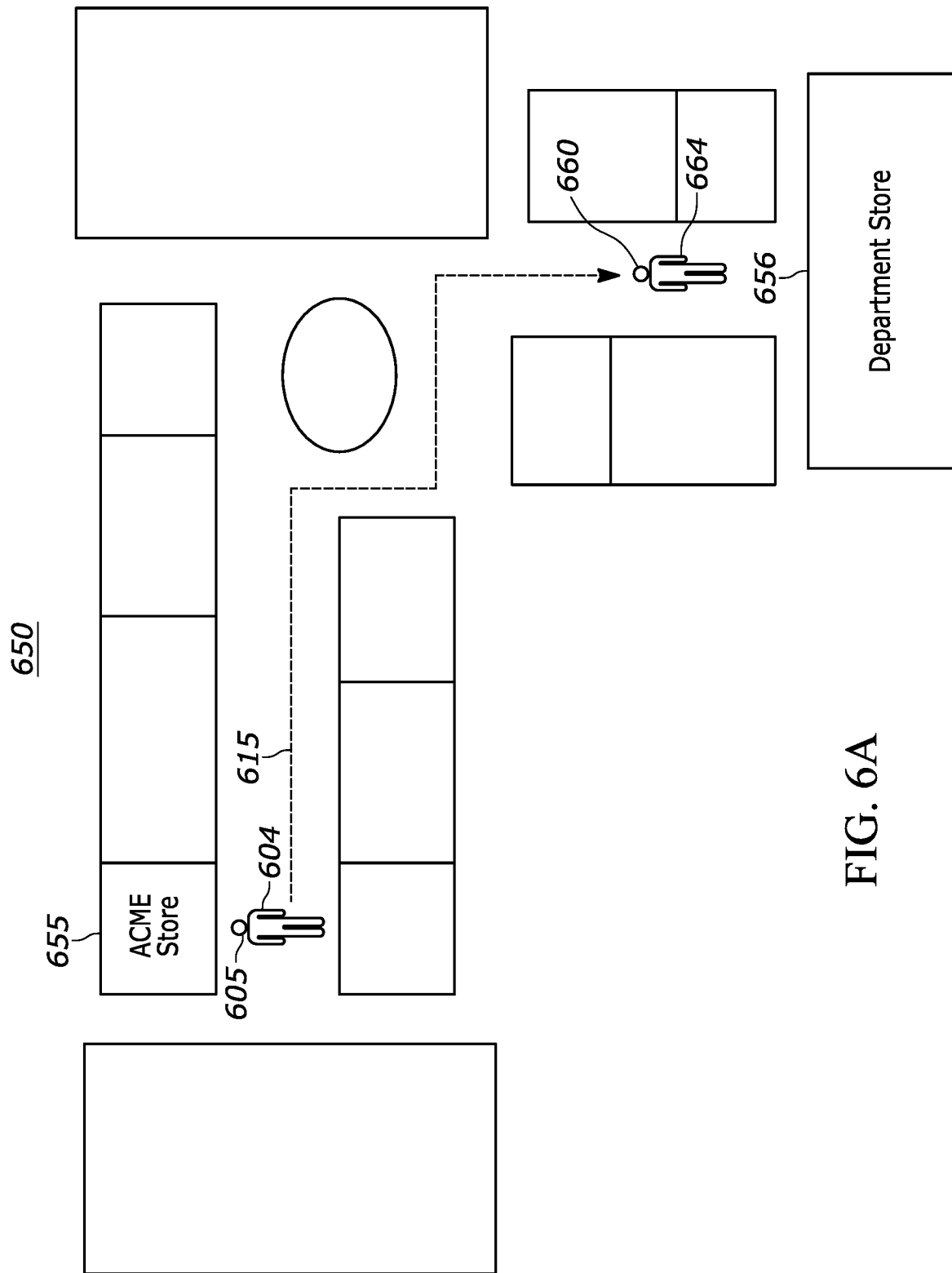
FIGS. 6A and 6B illustrates an exemplary environment and AR display, respectively, for using a POI database to find and navigate to a group member.
Figure 6B:
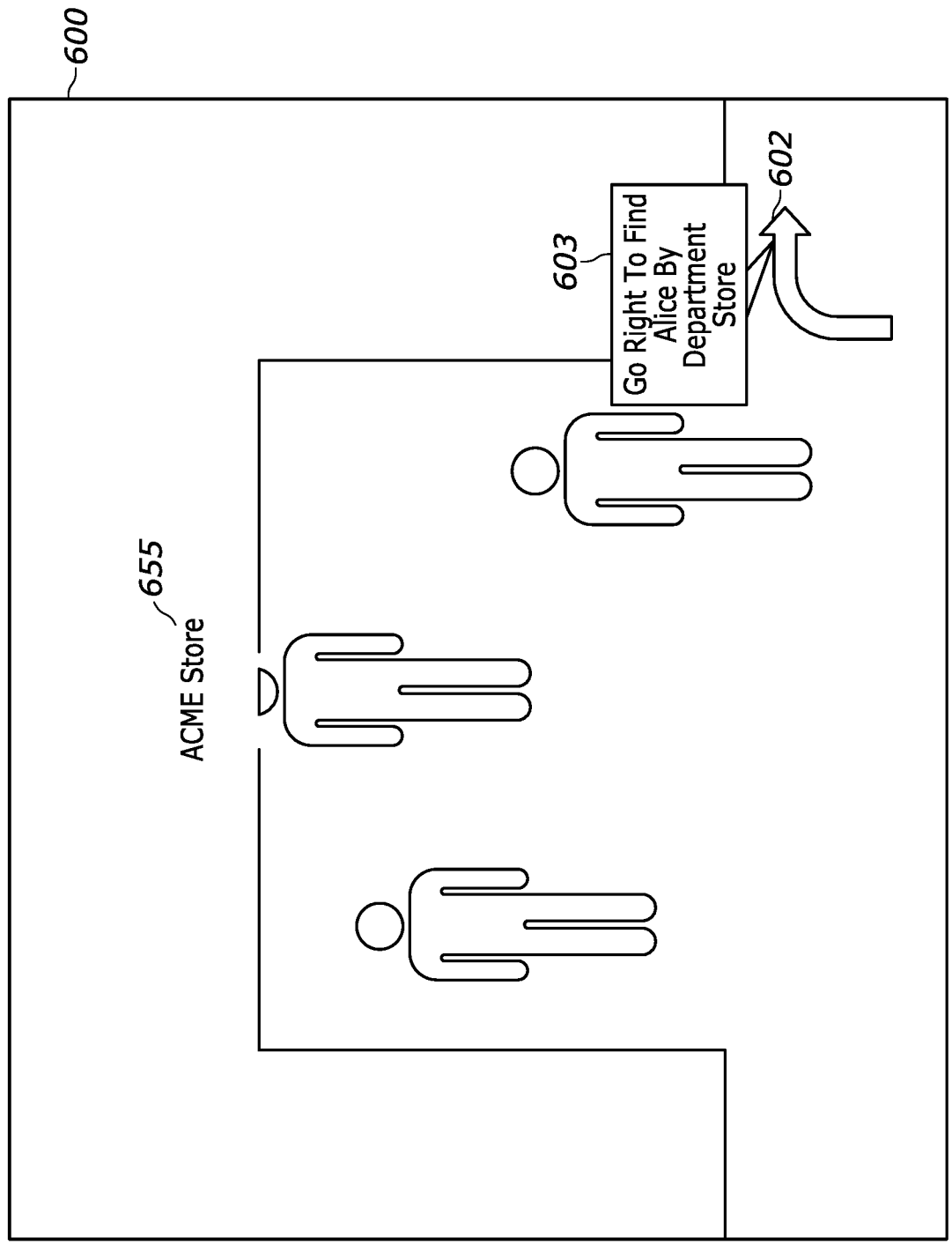

Turning now to FIGS. 6A and 6B, illustrated is an exemplary process for locating a group member based upon an indoor map and position data. More particularly, FIG. 6A illustrates an environment 650 that includes a user 604 wearing an AR viewer (such as the AR viewer 130 of FIG. 1) coupled to an AR device 605 (such as the AR devices 105, 505 of FIGS. 1 and 5A), a group member 664 wearing an AR viewer (such as a second AR viewer 130 of FIG. 1) coupled to an AR device 660 (such as an AR device 160 or 560 of FIGS. 1 and 5A), and points of interest 655, 656. It should be appreciated that while FIGS. 6A, 6B depict a mall environment, the disclosed techniques may be implemented in other environments, such as an airport, a convention center, a museum, etc.

In the illustrated scenario, the user 604 may initiate a finding and/or a navigation process via a groups application (such as the groups application 112 of FIG. 1). In response, a groups server (such as the server 170 of FIG. 1) may attempt to determine a relative position of the user 604 and the group member 664 using the POI 655 to locate the user 655 within the environment 650. Accordingly, the server may obtain a set of image data from an image sensor associated with the AR viewer coupled to the AR device 605 (such as the image sensors 132 of FIG. 1) and an image sensor associated with the AR device 660.

The server may then analyze the sets of image data to determine a location of the user 604 and the group member 664 within the environment 650. For example, the server may be coupled to a POI database (such as the POI database 155 of FIG. 1) that includes a map of the environment 650. In addition to the map, the mapping database may also include image data indicative a various POIs throughout the environment 650. In the instant mall environment 650, the POI image data may be associated with each store, vendor, amenity, etc. associated with the mall environment 650. In an alternative travel station environment, the POI image data may be associated with gates/ports, sales booths, kiosks, and/or other amenities. In an alternate museum environment, the POI image data may be associated with exhibits, halls, galleries, and/or other amenities.

Returning to the instant scenario, the server may compare the obtained image data to the image data in the mapping database to identify a position of the user 604 and the group member 664. For example, as shown in FIG. 6B, the image sensor of the AR device 605 may capture a set of image data that depicts the front entrance to the ACME store (the POI 655). Similarly, the image sensor of the AR device 660 may capture a set of image data that depicts a mall-facing entrance of the Department Store (the POI 656). Accordingly, the server may then query the POI database using the obtained sets of image data to identify a record associated with the POIs 655, 656 that indicates a location of the respective POI within the environment 650. Accordingly, the server is able to derive a current position and orientation of the user 604 and the group member 664 within the environment 650 based upon the position of the POIs 655, 656, respectively.

The server may then generate a route 615 to guide the user 604 from their determined current position to the position of the group member 664. More particularly, the server may analyze the mapping data of the environment 650 to derive the route 615. The server may then transmit an indication of the route 615 to the AR device 605 in manner that causes a navigation application executing on the AR device (such as the navigation application 114 of FIG. 1) initiates navigational guidance for the route 615.

FIG. 6B illustrates is an exemplary AR display 600 presented by an AR viewer (such as the AR viewer 130 of FIG. 1) coupled to the AR device 605 of FIG. 6A. In the illustrated scenario, the navigation application executing on the AR device 605 is configured to present navigational guidance for the route 615 to guide the user 604 to the group member 664. Accordingly, the navigation application may configure the AR display 600 to include an AR indicator 602 that indicates a direction of travel the user 604 should follow to proceed along the route 615. The AR indicator 602 may correspond to a dialog box 603 that includes a verbal description of the indicated navigational instruction and an indication of the position of the group member 664.

It should be appreciated that while the foregoing describes functionality being performed by a server, in other embodiments, the AR devices 505, 605 may be configured to locally perform the functionality described with respect to the server.

Figure 7:
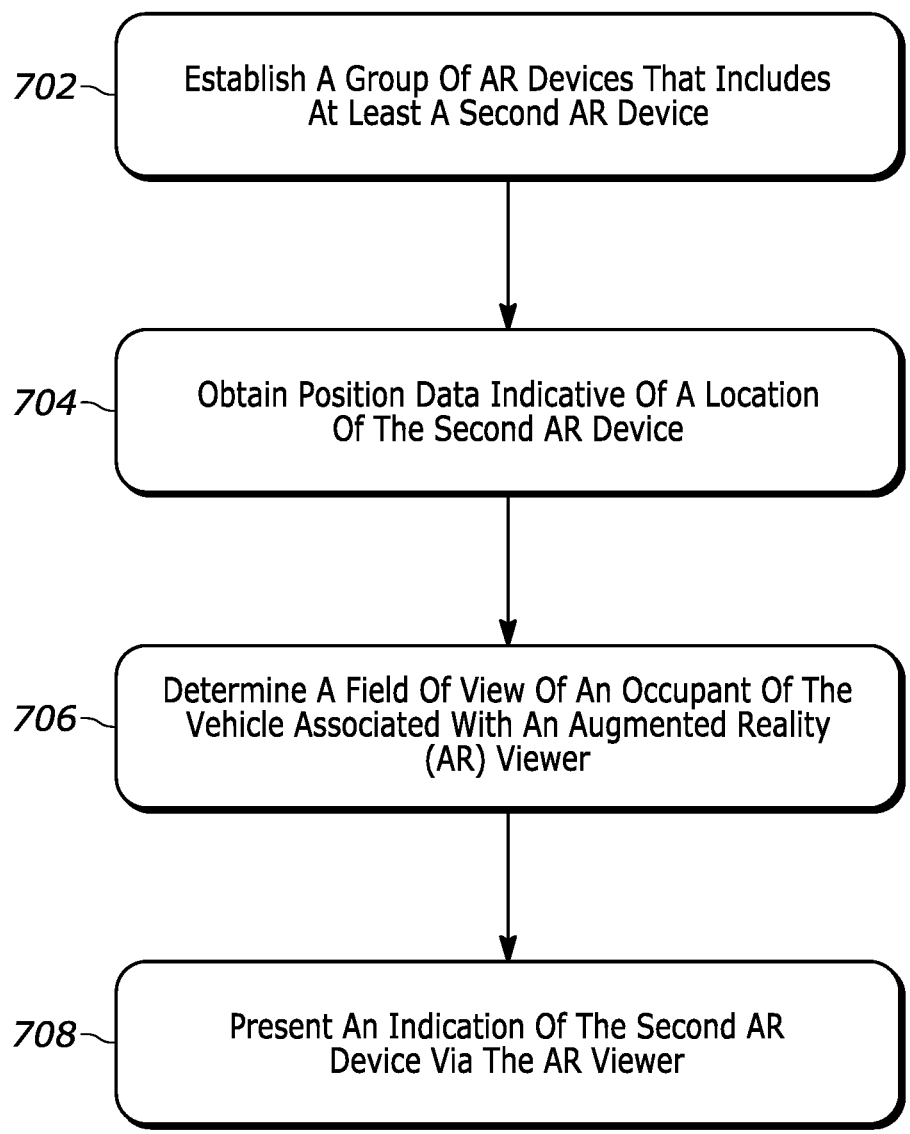
FIG. 7 illustrates a block diagram of an exemplary computer-implemented method for finding group members via an Augmented Reality (AR) device, in accordance with embodiments disclosed herein.

Turning now to FIG. 7, illustrated is an exemplary computer-implemented method 700 for finding group members via AR. The method 700 may be performed by an AR device (such as the AR devices 105, 505, 605 of FIGS. 1, 5A, 6A) executing a groups application (such as the groups application 112 of FIG. 1) and/or a navigation application (such as the navigation application 114 of FIG. 1).

The method may begin at block 702 when the AR device establishes a group of AR devices that includes at least a second AR device (such as the AR devices 160, 560, 660 of FIGS. 1, 5A, 6A) paired with an AR viewer (such as the AR viewer 130 of FIG. 1). For example, the AR device may present a user interface associated with the groups application (such as the user interface 200 of FIG. 2) that enables the user of the AR device to establish the group of AR devices. As another example, the AR device may establish the group of AR devices by performing an interaction with a third-party application (such as by ordering a pickup via a ride-sharing application).

At block 704, the AR device obtains position data indicative of a location of the second AR device. In some embodiments, the AR device obtains data generated by a position sensor of the second AR device. In some other embodiments, the position data may be obtained by obtaining, from an image sensor coupled to the AR viewer (such as the image sensors 132 of FIG. 1), a first set of image data of an environment included within the field of view and receiving, from the second AR device, a set of image data generated by an image sensor coupled to a second AR viewer associated with the second AR device. In these embodiments, the AR device may identify a point of interest (POI) included represented by both the first and second sets of image data and determine a relative position of the second AR device by comparing at least one of a size of the POI, a perspective of the POI, and a position of the POI between the first and second sets of image data.

Additionally or alternatively, the position data may be obtained by receiving, from the second AR device, a set of image data generated by an image sensor coupled to a second AR viewer associated with the second AR device and detecting a POI represented by the set of image data. The AR device may then compare the image data representative of the POI to image data in a POI database to identify the POI and obtain a location of the identified POI from the POI database. In other embodiments, the AR device may obtain the position data from a server configured to perform the foregoing analyses.

In other embodiments, the AR device is configured to obtain the position data by detecting, via a photodetector paired with the AR viewer, light emitted by the second AR device. For example, the second AR device may be a personal electronic device or an electronic device associated with a vehicle. In these embodiments, the light emitted by the second AR device may encode an identifier associated with at least one of the second AR device or the group of AR devices. Accordingly, the AR device may decode the light emitted by the second AR device to derive the identifier. The AR device may then determine the position by analyzing a set of image data to identify a source of the light.

In some embodiments, the ability to obtain the position data of the second AR device is associated with a set of permissions. Accordingly, in these embodiments, the AR device may be configured to query a location sharing permission associated with the second AR device (such as permissions maintained at the groups database 175 of FIG. 1) and obtain the position data in response to satisfying the location sharing permission query.

At block 706, the AR device determines a field of view of an AR viewer paired with the AR device. In some embodiments, the AR device determines the field of view by obtaining, from an image sensor coupled to the AR viewer, a first set of image data of an environment included within the field of view.

At block 708, the AR device presents an indication of the second AR device via the AR viewer based upon the location of the second AR device and the field of view. In some embodiments, this includes presenting an AR indicator at a location within the field of view associated with the second AR device. Additionally or alternatively, the AR device may present navigational instructions to navigate to the second AR device. In these embodiments, the AR device may obtain mapping data associated with an environment of the first AR device and a set of image data of the environment from an image sensor coupled to the AR viewer. The AR viewer may then correspond the mapping data to the set of image data and overlay the navigational instructions onto the environment via the AR viewer.

In some embodiments, to present the navigational instructions, the AR device may be configured to obtain, from an image sensor coupled to the AR viewer, a set of image data of the environment of the first AR device and analyze the set of image data to detect one or more navigable pathways within the environment. The AR device may then generate the navigational instructions by determining a route between the first AR device and the second AR device that includes at least one detected navigable pathway.

In some embodiments, the group of AR devices includes a third AR device. In these embodiments, the AR device may be configured to obtain positional data indicative of a location of the third AR device and present an indication of the third AR device via the AR viewer based upon the location of the third AR device and the field of view in a similar manner as described with respect to blocks 704, 708 and the second AR device. The method may include additional, fewer, or alternate actions, including those discussed elsewhere herein.

AR Displays for Finding Group Members

When users are navigating to a destination, the ultimate destination to which the user is navigating may differ from the terminus for a route generated by applying conventional in-vehicle navigation techniques due to vehicle being unable to traverse all pathways (e.g., sidewalks, parks, designated pedestrian zones, and/or pathways inside a building). For example, many classrooms are located inside buildings situated on a quad restricted to vehicles. As such, a user relying on a conventional in-vehicle navigation application may be provided guidance to the quad, but is left without guidance to find the building and/or the classroom therein.

Figure 8:
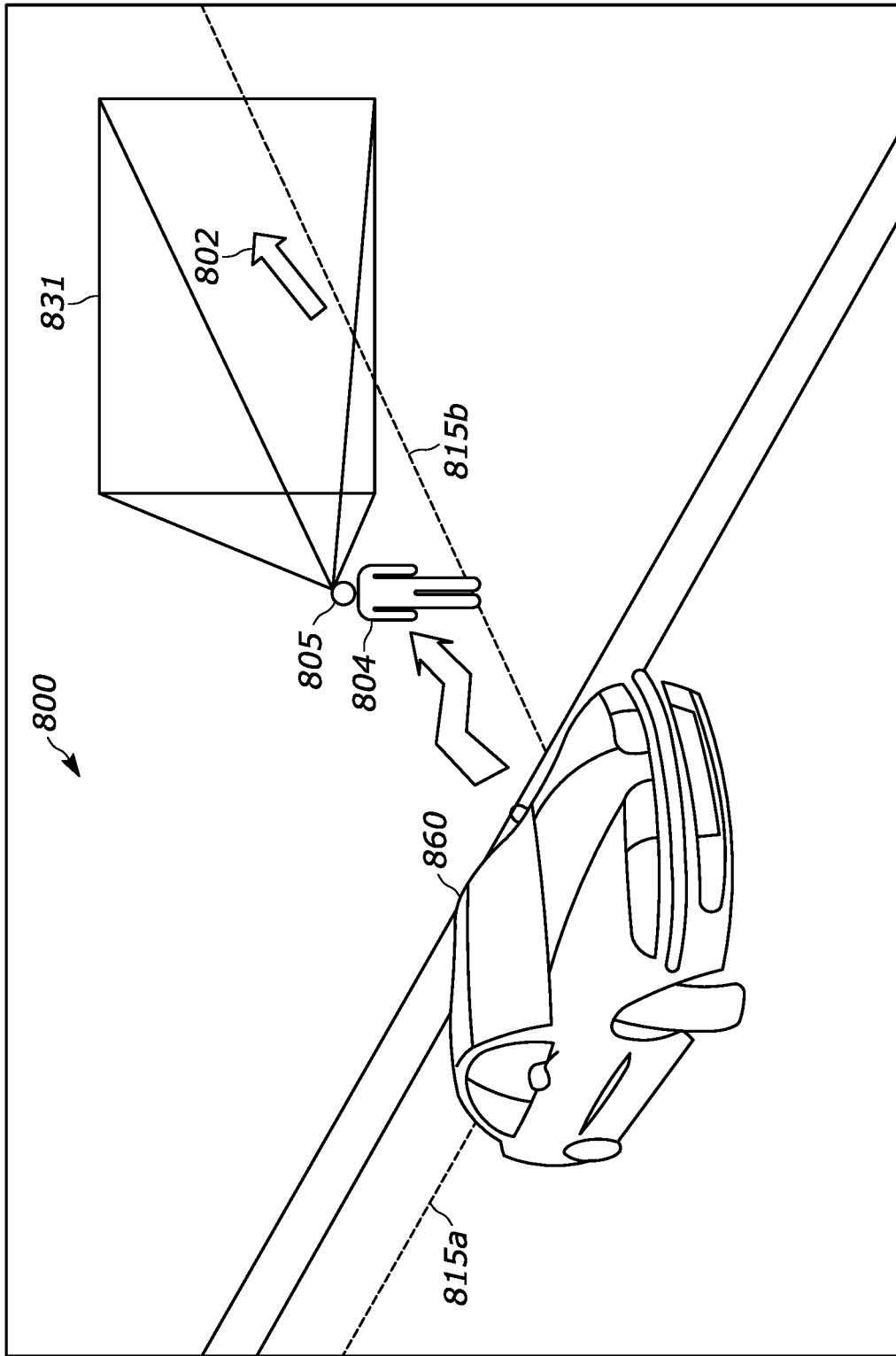
FIG. 8 illustrates an exemplary scenario for transitioning from conventional navigation to AR navigation.

Turning now to FIG. 8, illustrated is an exemplary scenario 800 for transitioning from conventional navigation to AR navigation. In the scenario 800, a user 804 is carrying an AR device 805 (such as the AR device 105, 505, 605 of FIGS. 1, 5A, 6A) executing a navigation application (such as the navigation application 114 of FIG. 1). More particularly, the navigation application assisted the user 804 in traversing a route 815 that includes a vehicle portion 815a and a pedestrian portion 815b. During the vehicle portion 815a, the navigation application may perform conventional in-vehicle navigation via a vehicle 860 until reaching a terminus of the vehicle portion 815a. As illustrated, after reaching the terminus of the vehicle portion 815a, the user 804 exited the vehicle 860 while carrying the AR device 805 to continue traversing the route using AR-assisted navigation techniques along the pedestrian portion 815b.

Accordingly, after the user 804 exits the vehicle 860, the AR device 805 may be configured to cause the navigational guidance to continue via an AR display 831 presented via an AR viewer (such as the AR viewer 130 of FIG. 1) coupled to the AR device 805. In some embodiments, the AR device 805 detects that the user 804 has exited vehicle by detecting that a short-range communication link between the AR device 805 and an on-board system of the vehicle 860 has been terminated. For example, the AR device 805 may detect that a wired connection (such as a USB connection) or a wireless connection (such as a Bluetooth or Wi-Fi connection) with the on-board system of the vehicle 860 has been terminated. In other embodiments, the AR device 805 detects that the user 804 has exited the vehicle 860 by determining that position data generated by a positioning sensor of the AR device 805 (such as the positioning sensor 120 of FIG. 1) indicates a position restricted to vehicles.

Regardless, after detecting that the user 804 has exited the vehicle, the navigation application executing on the AR device 805 may switch output devices. That is, if the navigation application was configured to present conventional navigational guidance via a display of the vehicle 860 and/or the AR device 805 during the vehicle portion 815a, the navigation application may instead present navigational guidance via the AR display 831 during the pedestrian portion 815b. As illustrated, the navigational guidance may include an AR indicator 802 that indicates a navigational instruction while traversing a pedestrian portion 815b.

Figure 9:
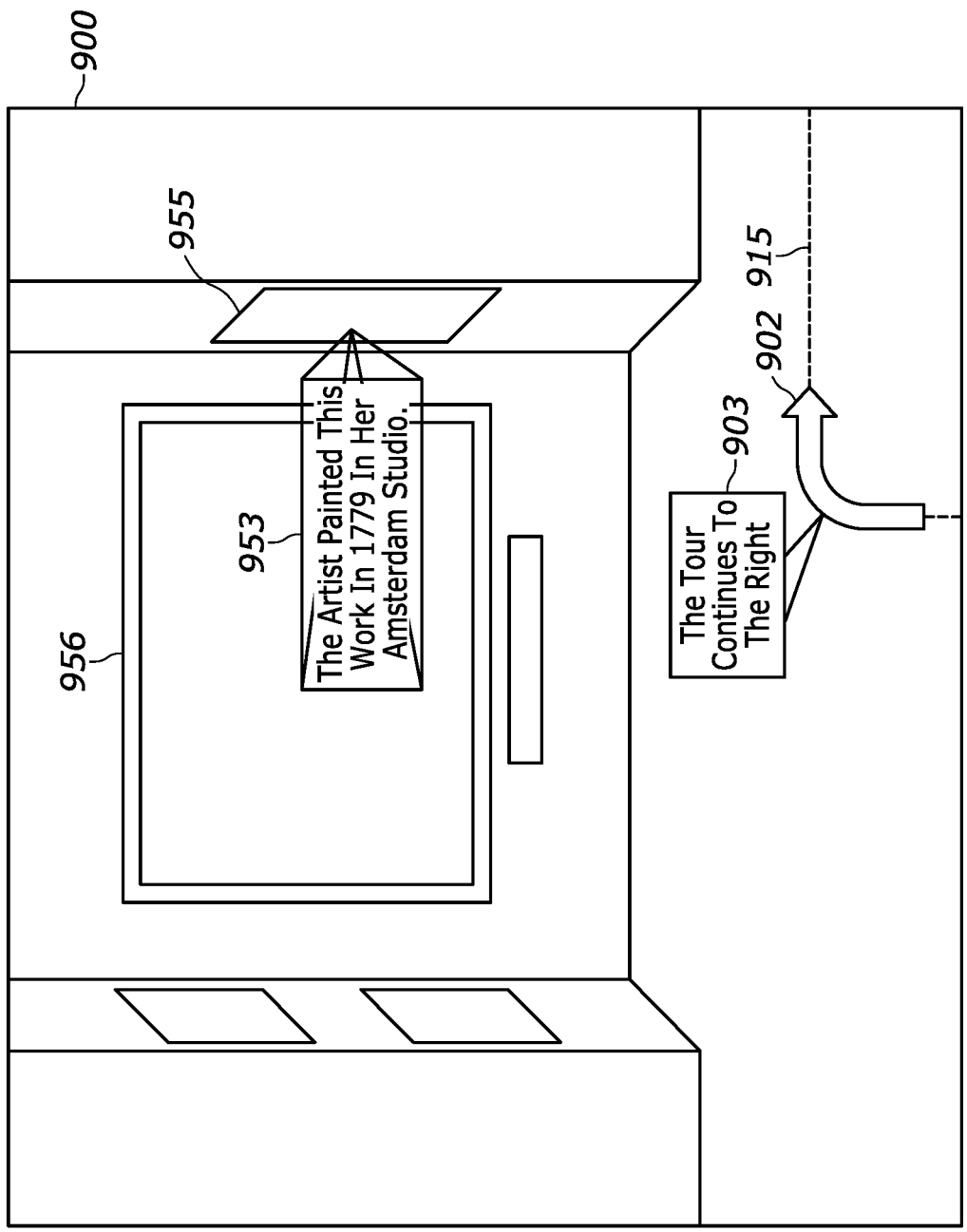
FIG. 9 illustrates an exemplary AR display for presenting AR indications related to a route.

Turning now to FIG. 9, illustrated is an exemplary AR display 900 for presenting AR indications related to a route 915. The AR display 900 may be generated by an AR device (such as the AR devices 105, 505, 605, 805 of FIGS. 1, 5, 6, and 8, respectively) executing a navigation application (such as the navigation application 114 of FIG. 1). The AR device may then transmit data associated with the AR display 900 to an AR viewer (such as the AR viewer 130 of FIG. 1) for presentation thereat. It should be appreciated that the example AR display 900 is merely exemplary, and alternative AR displays may include additional, fewer, and/or alternative AR indications.

In the illustrated scenario, the route 915 is related to a tour route through a museum. In this scenario, conventionally positioning techniques may be too imprecise to apply conventional in-vehicle techniques. Accordingly, techniques disclosed herein associated navigational instructions with POIs along the route 915. To this end, when the navigation application generated the route 915, the navigation application not only generated navigational instructions based up an indoor map of the museum, but also associated navigational instructions with POIs. For example, the route 915 calls for a right turn at the illustrated intersection. As illustrated, when the user approaches the illustrated intersection, the POI 956 (a particular artwork) is within a field of view of the AR viewer.

Accordingly, the AR device may be configured to capture and analyze image data from an image sensor coupled to the AR viewer (such as the image sensor 132 of FIG. 1) to assist in determining progress along the route. To this end, navigation application may be configured to analyze the image data to detect the presence of the POI 956. In one example, the navigation application may be configured to detect objects within the image data using an object recognition algorithm (such as a neural network, including convolutional neural networks, trained to predict an object type for candidate objects in a set of image data). Because the route 915 relies on the POI 956 as a point of reference for determining progress along the route, the object recognition model may be trained to particularly identify candidate art work objects. It should be appreciated that the object recognition model may also be adapted to recognize other types of POIs associated with other intersections along the route 915.

In this example, in response to the object recognition model identifying a candidate art work object, the navigation application may compare the corresponding image data of the candidate art work object to image data maintained in a POI database (such as the POI database 155 of FIG. 1) to identify that the candidate art work object corresponds to the POI 956. It should be appreciated that the foregoing provides one example algorithm for detecting the presence of the POI 956 and that other object recognition techniques known to those skilled in the art may be additionally or alternatively applied.

In some scenarios, detecting the presence of the POI 956 may be insufficient to accurately position the user along the route 915. For example, in the illustrated scenario, the POI 956 is a large art work that may be visible from some distance before the intersection associated with the navigational instruction. Accordingly, the navigation application may also determine a size of the object corresponding to the POI 956 to estimate a distance from the POI 956. To this end, because the POI 956 has a fixed position and size, the navigation application may compare a size of the object in a set of recent image data to a size of the POI 956 when the user is located at the illustrated intersection. When the size is within a threshold difference, the navigation application may determine that the user is positioned at the illustrated intersection and present an AR indication 902 and a corresponding dialog box 903 guiding the user along the route.

The navigation application may also utilize the determination of a presence at the illustrated intersection to provide additional content regarding POIs proximate to the intersection. To this end, the POI database may group POIs that are located in a similar area (e.g., in the same gallery or room). In the illustrated example, the POI database may indicate that the POI 955 is proximate to the POI 956. Accordingly, upon reaching the illustrated intersection, the navigation application may obtain tour content related to the POIs 555, 556 from the POI database. For example, the navigation application may obtain an audio file, a video, an animation, and/or other types of tour data for presentation via the AR device and/or the AR viewer. In some embodiments, the navigation application may refrain from presenting the AR indications 902, 903 related to the navigational instruction until after the obtained tour data has been presented to the user.

It should be appreciated that the foregoing techniques may be applied to other types of routes as well. In one example, if the user is traversing a route through a city by foot, the foregoing techniques may be applied to, for example, provide AR indications of amenities offered by buildings along the route. In another example, if the user is traversing a route through forest preserve or national park, the foregoing techniques may be applied to detect trail marker POIs and present AR indications describing alternate trails (such as a trail length, trail end point, trail difficulty, a presence of a hazard along the trail, etc.).

Figure 10:
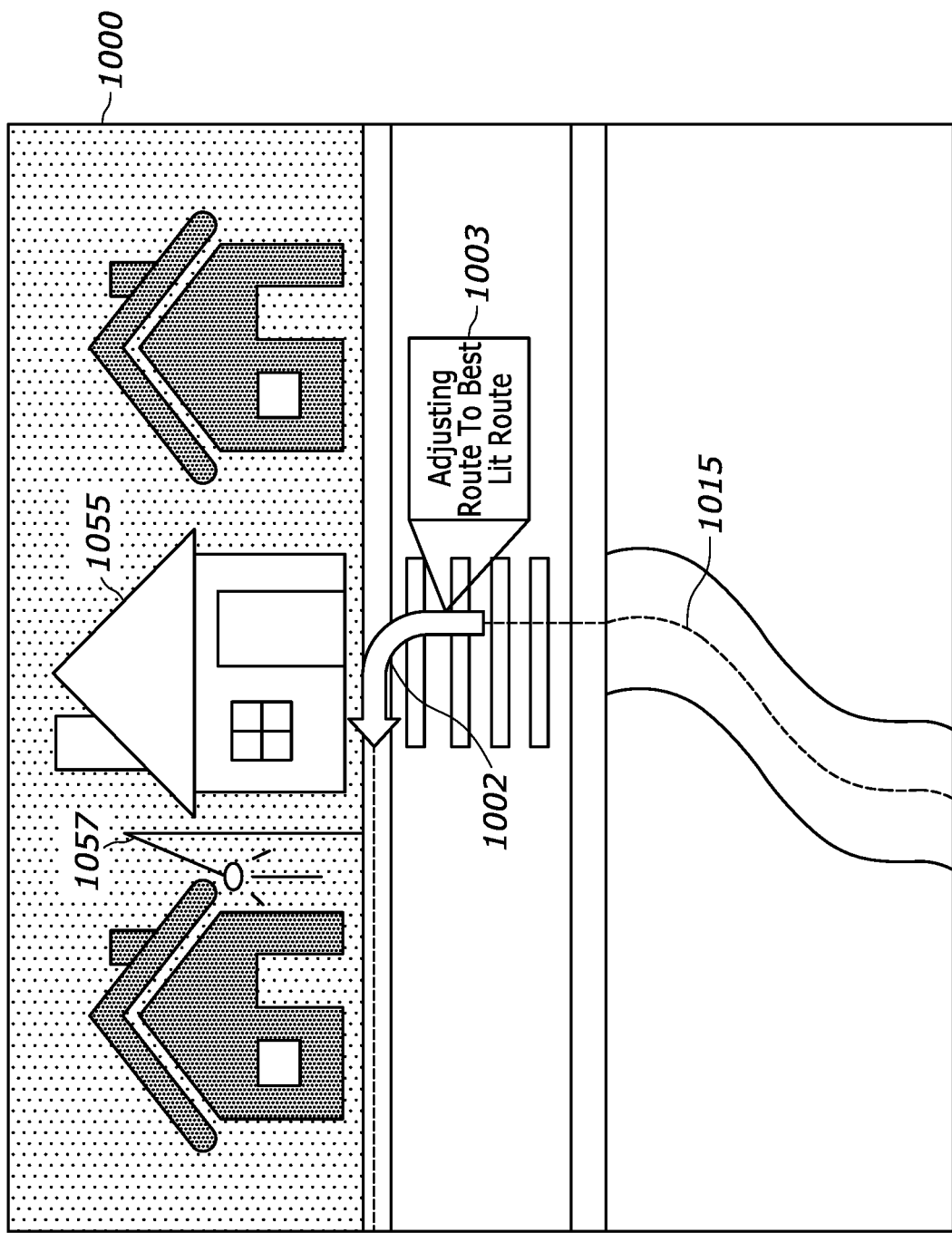
FIG. 10 illustrates an exemplary AR display for presenting AR navigational guidance in a manner that accounts for environmental lighting.

Turning now to FIG. 10, illustrated is an exemplary AR display 1000 for presenting AR navigational guidance associated with a route 1015 in a manner that accounts for environmental lighting. The AR display 1000 may be generated by an AR device (such as the AR devices 105, 505, 605, 805 of FIGS. 1, 5, 6, and 8, respectively) executing a navigation application (such as the navigation application 114 of FIG. 1). The AR device may then transmit data associated with the AR display 1000 to an AR viewer (such as the AR viewer 130 of FIG. 1) for presentation thereat. It should be appreciated that the example AR display 1000 is merely exemplary, and alternative AR displays may include additional, fewer, and/or alternative AR indications.

In the illustrated scenario, the user is traversing the route 1015 at night. As such, the user may be less able to identify POIs associated with navigational instructions. For example, the navigation application may associate the illustrated intersection along the route 1015 with the POI 1055. Depending on the lighting proximate to the POI 1055, the user may have a difficult time detecting the POI 1055 to determine that they are approaching a location associated with a navigational instruction along the route 1015.

Accordingly, the navigation application may be configured to detect that user is currently located a position where the POI 1055 is typically visible. For example, the navigation application may utilize position data obtained from a positioning sensor of the AR device (such as the positioning sensor 120 of FIG. 1). To improve the visibility of the POI 1055, the navigation application may obtain image data of the POI 1055 captured during the daytime from a POI database (such as the POI database 155 of FIG. 1). The navigation application may then overlay a portion of the obtained image onto the POI 1055 to cause the AR display 1000 to include a representation of the POI 1055 as viewed during the day time. As a result, the POI 1055 is more visible to the user when looking at the POI 1055 via the AR display 1000, thereby increasing the user's situational awareness. It should be appreciated that the foregoing techniques may also be applied to presenting prior indications of a POI in other scenarios, for example, when a building is undergoing renovation and/or is surrounded by scaffolding such that the user may be unable view identifying characteristics of the building without the supplemental AR display.

In another aspect, the user may feel unsafe traversing routes that are unlit, particularly late at night. Accordingly, the navigation application may be configured to capture and analyze image data from an image sensor coupled to the AR viewer (such as the image sensor 132 of FIG. 1) to assist in identifying potentially unsafe routes. For example, the navigation application may analyze a radiant intensity associated with the image data to areas within the environment that are associated with low levels of lighting.

In the illustrated scenario, the route 1015 may have originally directed the user to make a right turn at the illustrated scenario. However, navigation application may have detected a presence of streetlight 1057 to the left of the intersection and an absence of similar lighting to the right based upon the radiant intensity analysis. In response, the navigation application may have recalculated the route 1015 such that the route 1015 includes a left turn at the illustrated intersection, instead of a right turn. Accordingly, the navigation application may have configured the AR display 1000 to include an AR indication 1002 indicated the updated navigational instructions and provided a dialog box 1003 to indicate that the route 1015 was adjusted in view of the current lighting conditions. As illustrated, the AR indication 1002 may be presented proximate to the POI 1055 in the AR display 1000.

Figure 11:
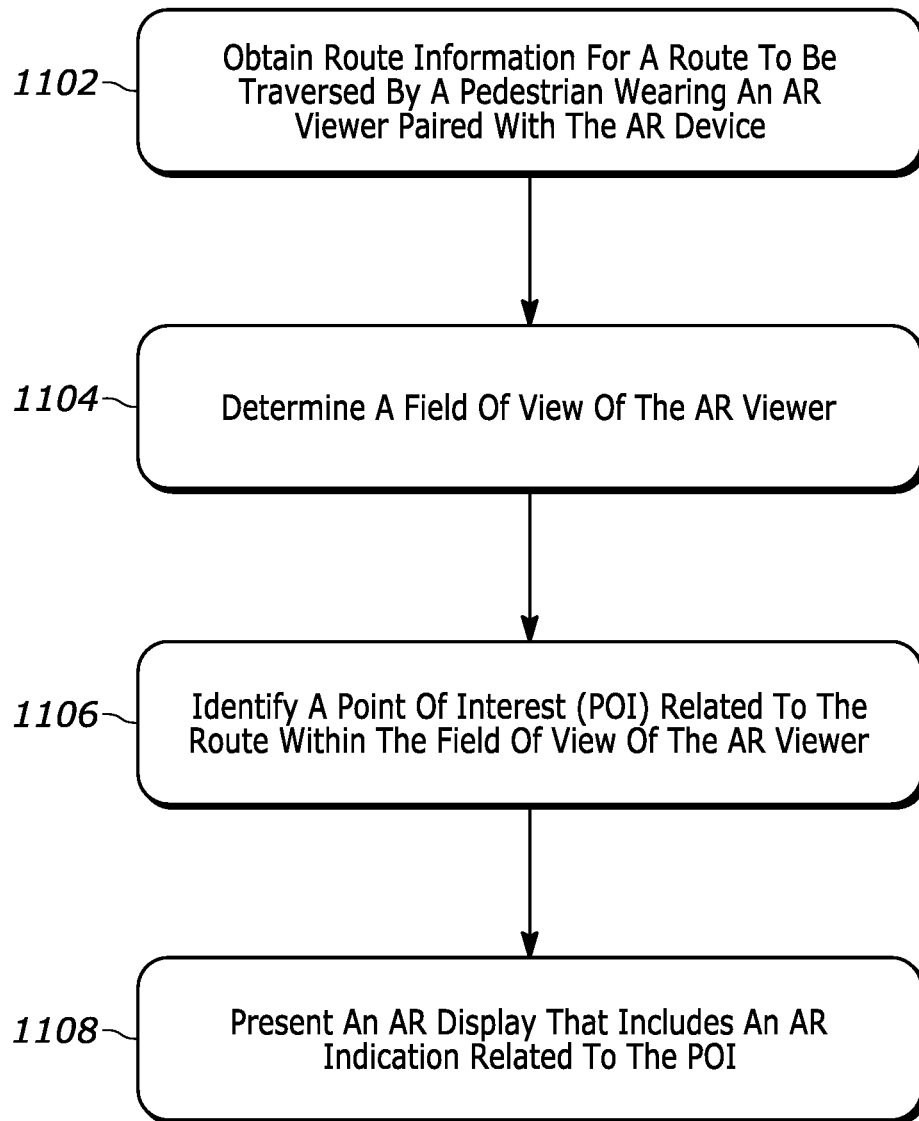
FIG. 11 illustrates a block diagram of an exemplary computer-implemented method for AR assisted pedestrian guidance, in accordance with embodiments disclosed herein.

Turning now to FIG. 11, illustrated is an exemplary computer-implemented method 1100 for AR-assisted pedestrian guidance. The method 1100 may be performed by an AR device (such as the AR devices 105, 505, 605, 805 of FIGS. 1, 5A, 6A, and 8, respectively) executing a navigation application (such as the navigation application 114 of FIG. 1).

The method may begin at block 1102 when the AR device obtains route information for a route to be traversed by a pedestrian wearing an AR viewer (such as the AR viewer 130 of FIG. 1) paired with the AR device. In some embodiments, the AR device may obtain the route information from the navigation application.

At block 1104, the AR device determines a field of view of the AR viewer. In some embodiments, the AR device determines the field of view by obtaining, from an image sensor coupled to the AR viewer, a first set of image data of an environment included within the field of view. In some embodiments, the route may include an in-vehicle portion of the route. In these embodiments, at least one of a personal electronic device or an on-board system of a vehicle may be configured to execute a navigation application to assist the pedestrian for in-vehicle navigation via the vehicle along the in-vehicle portion of the route. Accordingly, the AR device may detect that the pedestrian has egressed the vehicle and cause the navigation application executing on the AR device to provide navigational instructions for the route via the AR viewer. In some further embodiments, the AR device is the personal electronic device. In these embodiments, the AR device may switch an output device from a display of the personal electronic device to the AR viewer.

At block 1106, the AR device identifies a point of interest (POI) related to the route within the field of view of the AR viewer. In some embodiments, the POI is associated with a navigational instruction along the route. In some embodiments, the POI is along a tour route. Additionally or alternatively, the AR device may identify the POI by analyzing the set of image data to identify a POI associated with low lighting (e.g., the POI is unlit or poorly lit at night).

At block 1108, the AR device presents an AR display that includes an AR indication related to the POI based upon the field of view. For example, in embodiments where the POI is associated with the navigational instruction, the AR device may present an indication of the navigational instruction proximate to a location of the POI. As another example, in embodiments where the POI is associated with a tour route, the AR device may access a POI database to obtain content related to the POI and present an indication of the obtained content via the AR display.

As another example. in embodiments where the POI is associated with low lighting, the AR device may access a POI database to image data of the POI captured during daytime and overly the image data on the POI via the AR display. Similarly, in some embodiments, the AR device may analyze the set of image data to identify that a portion of the route is associated with low lighting. In these embodiments, the AR device may analyze the set of image data to identify an alternate pathway associated with higher lighting conditions and generate an alternate route that traverses the alternate pathway. The method may include additional, fewer, or alternate actions, including those discussed elsewhere herein.

Additional Considerations

As used herein, the term "indicia" means both singular and plural. For example, the phrase "vehicle safety indicia" may mean either of a single vehicle safety indicium (e.g., an ice patch) or multiple vehicle safety indicia (e.g., the presence of multiple vehicle, etc.).

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term ' ' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112(f).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations). A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Upon reading this disclosure, those of skill in the art will appreciate still additional alternative structural and functional designs for the approaches described herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

It is therefore intended that the foregoing detailed description be regarded as illustrative rather than limiting, and that it be understood that it is the following claims, including all equivalents, that are intended to define the spirit and scope of this invention.

What is claimed:

1. A computer-implemented method for finding group members via Augmented Reality (AR) paired with an AR viewer, the method comprising:

establishing, via one or more processors of an AR device, a group of AR devices that includes at least a second AR device;

obtaining, from an image sensor coupled to the AR viewer, a first set of image data of an environment included within a field of view of the image sensor;

obtaining, via the one or more processors, position data indicative of a location of the second AR device, wherein obtaining the position data comprises:

receiving, from the second AR device, a second set of image data generated by an image sensor coupled to a second AR viewer associated with the second AR device, identifying, via the one or more processors, a point of interest (POI) included represented by both the first and second sets of image data, and determining, via the one or more processors, a relative position of the second AR device by comparing at least one of a size of the POI, a perspective of the POI, and a position of the POI between the first and second sets of image data;

determining, via the one or more processors, a field of view of the AR viewer; and based upon the location of the second AR device and the field of view of the AR viewer, presenting, via the one or more processors, an indication of the second AR device via the AR viewer.

2. The computer-implemented method of claim 1, wherein obtaining the position data comprises:
obtaining, via the one or more processors, data generated by a position sensor of the second AR device.

3. The computer-implemented method of claim 1, wherein obtaining the position data comprises:
detecting, via a photodetector paired with the AR viewer, light emitted by the second AR device.

4. The computer-implemented method of claim 3, wherein:
the light emitted by the second AR device encodes an identifier associated with at least one of the second AR device or the group of AR devices; and
the method further comprises decoding the light emitted by the second AR device to derive the identifier.

5. The computer-implemented method of claim 3, wherein the second AR device is an electronic device associated with a vehicle.

6. The computer-implemented method of claim 3, wherein the second AR device is a personal electronic device.

7. The computer-implemented method of claim 1, wherein obtaining the position data comprises:
receiving, from the second AR device, a set of image data generated by an image sensor coupled to a second AR viewer associated with the second AR device;
detecting, via the one or more processors, a POI represented by the set of image data;
comparing, via the one or more processors, the image data representative of the POI to image data in a POI database to identify the POI; and
obtaining, via the one or more processors, a location of the identified POI from the POI database.

8. The computer-implemented method of claim 1, wherein presenting the indication of the second AR device comprises:
presenting, via the one or more processors, an AR indicator at a location within the field of view associated with the second AR device.

9. The computer-implemented method of claim 1, wherein presenting the indication of the second AR device comprises:
presenting, via the one or more processors, navigational instructions to navigate to the second AR device.

10. The computer-implemented method of claim 9, wherein presenting the navigational instructions comprises:
obtaining, via the one or more processors, mapping data associated with an environment of the first AR device;
obtaining, from an image sensor coupled to the AR viewer, a set of image data of the environment;
corresponding, via the one or more processors, the mapping data to the set of image data; and
overlaying, via the one or more processors, the navigational instructions onto the environment via the AR viewer.

11. The computer-implemented method of claim 9, wherein presenting the navigational instructions comprises:
obtaining, from an image sensor coupled to the AR viewer, a set of image data of the environment of the first AR device;
analyzing, via the one or more processors, the set of image data to detect one or more navigable pathways within the environment; and
generating, via the one or more processors, the navigational instructions by determining a route between the first AR device and the second AR device that includes at least one detected navigable pathway.

12. The computer-implemented method of claim 1, wherein:
the group includes a third AR device; and
the method further comprises:
obtaining, via the one or more processors, positional data indicative of a location of the third AR device; and
based upon the location of the third AR device and the field of view, presenting, via the one or more processors, an indication of the third AR device via the AR viewer.

13. The computer-implemented method of claim 1, wherein obtaining the position data comprises:
querying, via the one or more processors, a location sharing permission associated with the second AR device; and
obtaining, via the one or more processors, the position data in response to satisfying the location sharing permission query.

14. A system for finding group members via an Augmented Reality (AR) device paired with an AR viewer, the system comprising:
one or more processors; and
one or more non-transitory memories storing processor-executable instructions that, when executed by the one or more processors, cause the system to:
establish a group of AR devices that includes at least a second AR device;
obtain, from an image sensor coupled to the AR viewer, a first set of image data of an environment included within a field of view of the image sensor;
obtain position data indicative of a location of the second AR device, wherein to obtain the position data, the instructions, when executed, cause the system to:
receive, from the second AR device, a second set of image data generated by an image sensor coupled to a second AR viewer associated with the second AR device, identify a point of interest (POI) included represented by both the first and second sets of image data, and
determine a relative position of the second AR device by comparing at least one of a size of the POI, a perspective of the POI, and a position of the POI between the first and second sets of image data;
determine a field of view of the AR viewer; and
based upon the location of the second AR device and the field of view of the AR viewer, present an indication of the second AR device via the AR viewer.

15. The system of claim 14, wherein to obtain the position data, the instructions, when executed, cause the system to:
obtain data generated by a position sensor of the second AR device.

16. The system of claim 14, wherein to obtain the position data, the instructions, when executed, cause the system to:
detect, via a photodetector paired with the AR viewer, light emitted by the second AR device.

17. The system of claim 16, wherein:
the light emitted by the second AR device encodes an identifier associated with at least one of the second AR device or the group of AR devices; and
the instructions, when executed, cause the system to decode the light emitted by the second AR device to derive the identifier.

18. The system of claim 14, wherein to obtain the position data, the instructions, when executed, cause the system to:
receive, from the second AR device, a set of image data generated by an image sensor coupled to a second AR viewer associated with the second AR device;
detect a POI represented by the set of image data;
compare the image data representative of the POI to image data in a POI database to identify the POI; and
obtain a location of the identified POI from the POI database.

19. A non-transitory computer-readable storage medium storing computer-executable instructions that when executed by one or more processors of an Augmented Reality (AR) device paired with an AR viewer, cause the one or more processors to:
establish a group of AR devices that includes at least a second AR device;
obtain, from an image sensor coupled to the AR viewer, a first set of image data of an environment included within a field of view of the image sensor;
obtain position data indicative of a location of the second AR device, wherein to obtain the position data, the instructions, when executed, cause the one or more processors to:
receive, from the second AR device, a second set of image data generated by an image sensor coupled to a second AR viewer associated with the second AR device,
identify a point of interest (POI) included represented by both the first and second sets of image data, and
determine a relative position of the second AR device by comparing at least one of a size of the POI, a perspective of the POI, and a position of the POI between the first and second sets of image data;
determine a field of view of the AR viewer; and
based upon the location of the second AR device and the field of view of the AR viewer, present an indication of the second AR device via the AR viewer.

* * * * *